United States Patent
Vogt et al.

(10) Patent No.: US 9,942,122 B2
(45) Date of Patent: Apr. 10, 2018

(54) FAST PACKET RETRIEVAL BASED ON FLOW ID AND METADATA

(71) Applicant: AirMagnet, Inc., Santa Clara, CA (US)

(72) Inventors: Robert Vogt, Colorado Springs, CO (US); Peter Reilly, Colorado Springs, CO (US); Blair Pendelton, Colorado Springs, CO (US); Arong Pan, Beijing (CN); Lei Xiong, Beijing (CN); Matthew Richards, Colorado Springs, CO (US)

(73) Assignee: AirMagnet, Inc., Santa Clara, CA (US)

( * ) Notice: Subject to any disclaimer, the term of this patent is extended or adjusted under 35 U.S.C. 154(b) by 256 days.

(21) Appl. No.: 15/056,508

(22) Filed: Feb. 29, 2016

(65) Prior Publication Data

US 2017/0250889 A1 Aug. 31, 2017

(51) Int. Cl.
*H04L 12/26* (2006.01)
*H04L 12/801* (2013.01)
(Continued)

(52) U.S. Cl.
CPC ............ *H04L 43/106* (2013.01); *G06F 17/30* (2013.01); *H04L 43/04* (2013.01);
(Continued)

(58) Field of Classification Search
None
See application file for complete search history.

(56) References Cited

U.S. PATENT DOCUMENTS

| 2003/0131098 A1 | 7/2003 | Huntington et al. |
| 2009/0295911 A1* | 12/2009 | Grim, III ............... H04N 5/913 348/61 |

(Continued)

FOREIGN PATENT DOCUMENTS

| EP | 2317697 A1 | 5/2011 |
| EP | 2955643 A1 | 12/2015 |

OTHER PUBLICATIONS

Extended European Search Report for European Patent Application No. 17158305.7, dated Jul. 11, 2017.

*Primary Examiner* — Shukri Taha
(74) *Attorney, Agent, or Firm* — Locke Lord LLP; Scott D. Wofsy; Christopher J. Capelli (57) ABSTRACT

A storage system includes network monitoring device having NIC coupled to network and configured to capture raw data packets. The system further includes 4 data repositories. A first repository stores captured packets. A second repository stores captured packets' metadata. A third repository stores captured packets' and metadata's timestamp indexed data. A fourth repository stores captured packets' data flow. The storage system further includes a storage engine coupled to the repositories. The storage engine receives packet search criteria specifying at least a first time range. Data flow information associated with the search criteria is retrieved from the fourth repository. The retrieved data flow information is associated with a second, narrower, time range. Metadata information associated with the second time range is retrieved from the second repository using corresponding timestamp indexed data. Captured packets associated with the retrieved metadata are retrieved from the first repository using corresponding timestamp indexed data.

20 Claims, 4 Drawing Sheets

(51) Int. Cl.
*H04L 12/863* (2013.01)
*G06F 17/30* (2006.01)

(52) U.S. Cl.
CPC ...... *H04L 43/0888* (2013.01); *H04L 43/0894* (2013.01); *H04L 47/10* (2013.01); *H04L 47/50* (2013.01); H04L 43/026 (2013.01); H04L 43/045 (2013.01)

(56) References Cited

U.S. PATENT DOCUMENTS

2012/0047247 A1   2/2012  Piernot
2016/0224570 A1*  8/2016  Sharp ................ G06F 17/30073
2017/0139996 A1*  5/2017  Marquardt ........ G06F 17/30477

* cited by examiner

FAST PACKET RETRIEVAL BASED ON FLOW ID AND METADATA

FIELD OF THE INVENTION

This specification is directed, in general, to high speed networks and, more particularly, method for fast packet retrieval based on Flow ID and me

BACKGROUND OF THE INVENTION

High-speed packet-based communications networks are known in the art. These communication networks are experiencing rapidly increasing growth in capacity. This capacity growth is reflected by individual channel data rates scaling from 10 Gbps (gigabits per second), to 40 Gbps, to developing 100 Gbps, and to future projections of 1000 Gbps channels and higher. The capacity growth is also reflected in rapidly increasing overall traffic carried within such networks which can be measured in hundreds of gigabytes or even terabytes over a very short period of time.

In network analysis of such high-speed communications networks, large amounts of data will be seen by a network analyzer. Heretofore, the approach in network monitoring and analysis has been to save all traffic (i.e., data packets) that a monitoring device sees, irrespective of packet properties, and later sift through the stored data for analysis and retrieval purposes. This makes the process of retrieving packets which meet specified criteria very costly and time consuming.

Accordingly, it would be advantageous to provide an efficient packet retrieval solution for high-speed packet-based communications networks.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a storage system in a high capacity network is described in which an illustrated embodiment includes a network monitoring device having a network interface card coupled to the high capacity network and configured to provide raw captured data packets from the high capacity network. The storage system further includes four different data repositories. A first data repository is configured to store the raw captured packets. A second data repository is configured to store metadata associated with the raw captured data packets stored in the first data repository. A third data repository is configured to store timestamp indexed data associated with the raw data packets stored in the first data repository and timestamp indexed data associated with the metadata stored in the second data repository. A fourth data repository is configured to store data flow information associated with the raw captured data packets stored in the first repository. The storage system further includes a storage engine coupled to the first, second, third and fourth data repositories. The storage engine is configured to receive packet search criteria. The packet search criteria specify at least a first time range. Data flow information associated with the packet search criteria is retrieved from the fourth data repository. The retrieved data flow information is associated with a second time range narrower than the first time range. Metadata information associated with the second, narrower, time range is retrieved from the second data repository using corresponding timestamp indexed data stored in the third repository. Raw captured packets associated with the retrieved metadata are retrieved from the first data repository using corresponding timestamp indexed data stored in the third data repository.

In another aspect, a method for retrieving captured network traffic data in a high capacity network is provided. Packet search criteria are received. The packet search criteria specify at least a first time range. Data flow information associated with the packet search criteria is retrieved from a fourth data repository. The retrieved data flow information is associated with a second time range. The second time range is narrower than the first time range. The fourth data repository is configured to store data flow information associated with captured raw data packets stored in a first data repository. Metadata information associated with the second time range is retrieved from a second data repository using corresponding timestamp indexed data stored in a third data repository. The second data repository is configured to store metadata associated with the raw data packets stored in the first data repository. The third data repository is configured to store timestamp indexed data associated with the raw data packets stored in the first data repository and configured to store timestamp indexed data associated with the metadata stored in the second data repository. Raw captured data packets associated with the retrieved metadata are retrieved from the first data repository using corresponding timestamp indexed data stored in the third data repository.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present invention is now described more fully with reference to the accompanying drawings, in which illustrated embodiments of the present invention is shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein. One skilled in the art will appreciate further features and advantages of the invention based on the below-described embodiments. Accordingly, the invention is not to be limited by what has been particularly shown and described, except as indicated by the appended claims.

Additionally, the word "exemplary" as used herein means serving as an example, instance, or illustration. Any aspect or design described herein as "exemplary" is not necessarily to be construed as preferred or advantageous over other aspects or designs.

Embodiments of the present invention provide techniques for retrieving network traffic data in an efficient manner. The data retrieval techniques described below may be applied to different domains and contexts. In one embodiment, the techniques may be used in the high speed networking or data communication domain. In the high speed networking environment, the disclosed data retrieval techniques may be employed by network monitoring and network data storage devices, such as SAN (Storage Area Network) devices and NAS (Networked-Attached Storage) devices that use improved indexing techniques to store network data received by the storage devices and to retrieve specific timestamped network traffic data based on user-specified search criteria. The data storage and retrieval techniques disclosed by various embodiments of the present invention are scalable and can support high data throughput rates such as 100 Gbps and greater that are required by many high-speed data transmission standards.

Generally, disk drives, solid state drives, hybrid drives, or similar data storage components (collectively referred to as "storage drives," "data storage drives," "storage devices," or "data storage devices" below) may be communicatively coupled to a network monitoring system to store and retrieve blocks of network traffic data. Blocks of data may be, for example, 512 bytes in size.

Figure 1:
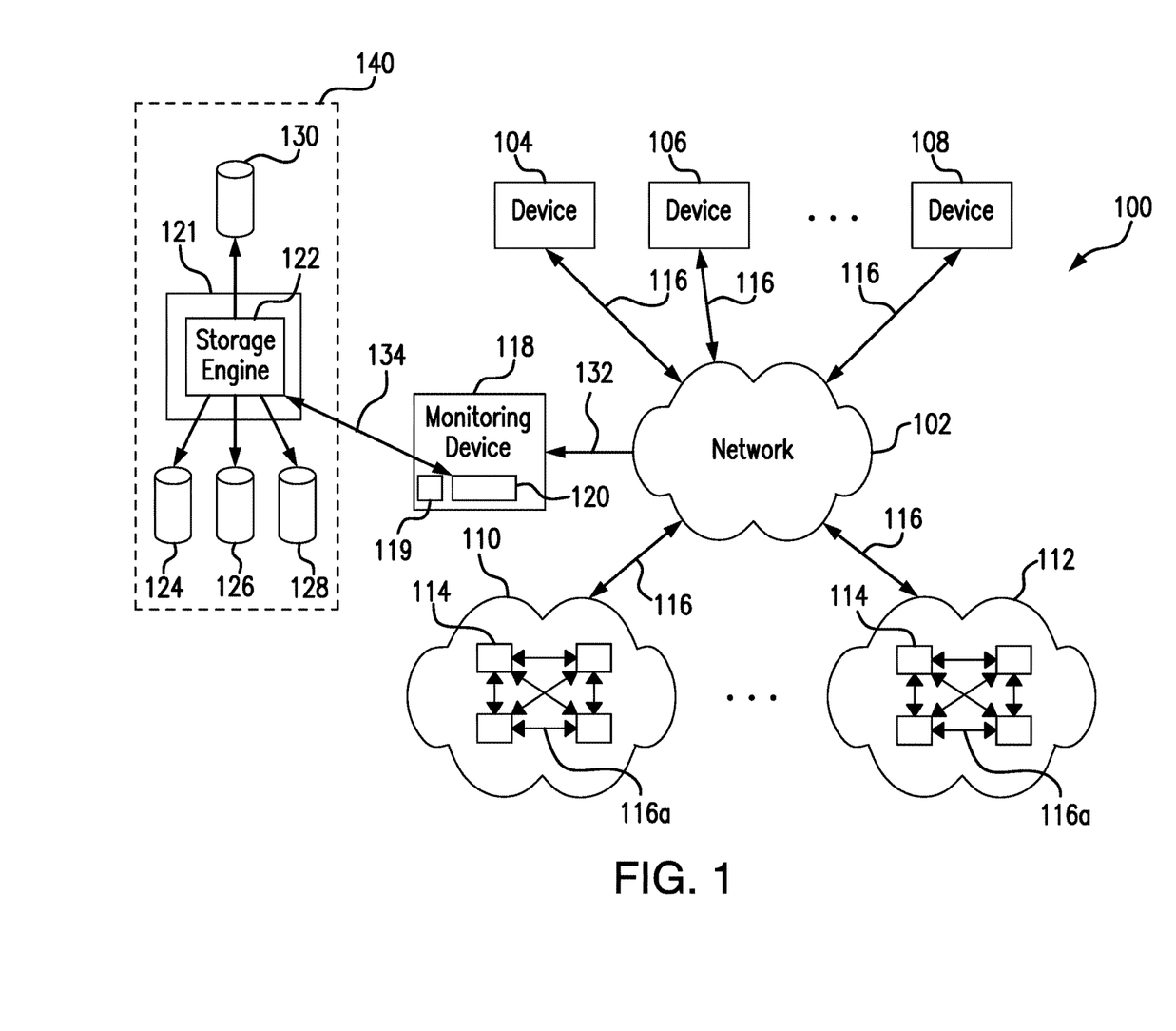
FIG. 1 is a simplified block diagram of a system and network environment that may incorporate an embodiment of the present invention.

Turning now descriptively to the drawings, in which similar reference characters denote similar elements throughout the several views, FIG. 1 is a simplified block diagram of a system and network environment that may incorporate an embodiment of the present invention. Network environment 100 may comprise any number of transmitting devices, data links, and receiving devices. As shown, network environment 100 includes a plurality of network devices 104-108 and a plurality of sub-networks 110, 112 coupled to a high-speed network 102. Additionally, sub-networks 110, 112 include one or more nodes 114.

Network devices 104-108 and nodes 114 may be any type of device capable of transmitting or receiving data via a communication channel, such as a router, switch, hub, host network interface, and the like. Sub-networks 110, 112 and network 102 may be any type of network that can support data communications using any of a variety of protocols, including without limitation Ethernet, Asynchronous Transfer Mode (ATM), token ring, Fiber Distributed Data Interface (FDDI), 802.11, TCP/IP, Internetwork Packet eXchange (IPX), and the like. Merely by way of example, sub-networks 110, 112 and network 102 may be a LAN, a WAN, a virtual network (such as a virtual private network (VPN)), the Internet, an intranet, an extranet, a public switched telephone network (PSTN), an infra-red network, a wireless network, and/or any combination of these and/or other networks.

Data may be transmitted between any of network devices 104-108, sub-networks 110, 112, and nodes 114 via one or more data links 116. Data links 116 may be configured to support the same or different communication protocols. Further, data links 116 may support the same or different transmission standards (e.g., 100 G Ethernet for links between network devices 104-108 and network 102 and 10 G Ethernet for links 116a between nodes 114 of sub-network 110). In one embodiment, at least one data link 116 is configured to support 100 G Ethernet. Additionally, at least one device connected to that link (e.g., a receiving device) is configured to support a data throughput of at least 100 Gbps.

As shown in FIG. 1, a network monitoring device 118 is also connected to network devices 104-108, sub-networks 110, 112 and nodes 114 via network (data) link 132, for example, and may include a user interface 119 that enables a user to interact with the network monitoring device 118, to operate the network monitoring device 118 and obtain data therefrom, whether at the location of installation or remotely from the physical location of the network monitoring device 118. Network monitoring device 118 may also include a Network Interface Card ("NIC") 120 that enables an interface(s) between the network monitoring device and network links 132 and 134. NIC 120 may be implemented on a printed circuit card or be a single, or coupled set, of semiconductor devices ("chips"). In some embodiments, NIC 120 may be implemented as a virtual network interface card (vNIC). To the extent that any term is not specially defined in this specification, the intent is that the term is to be given its plain and ordinary meaning.

Network monitoring device 118 comprises hardware and software, CPU, memory, interfaces and the like to operate to connect and monitor traffic on the network 102, as well as to perform various testing and measurement operations, transmit and receive data and the like. Network monitoring device 118 may also be connected to data storage device 121 via network link 134.

Figure 5:
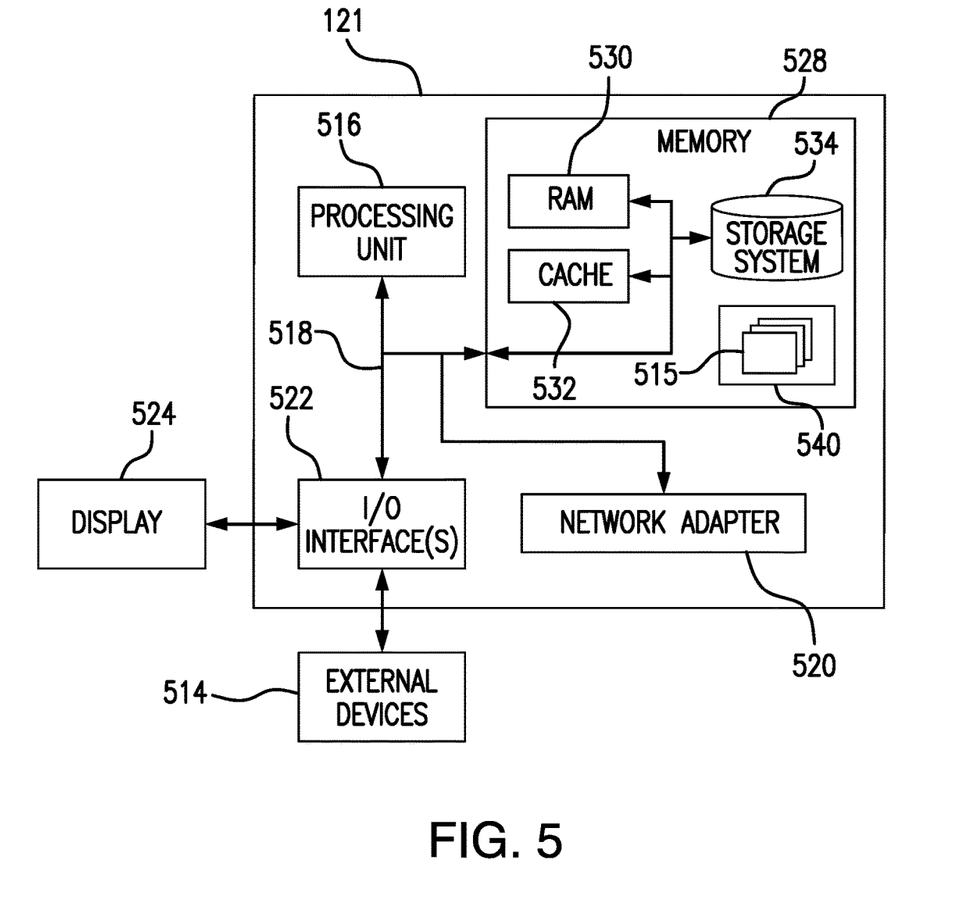
FIG. 5 illustrates internal and external components of a network data storage device in accordance with illustrative embodiments of the present invention.

Data storage device 121 may be a component of a specialized network data storage system 140. In one embodiment, data storage device 121 may contain a reduced capacity or minimized operating and file management system (e.g., a microkernel) and may be configured to process only input/output (I/O) requests by supporting common file sharing protocols such as the Unix network file system (NFS), DOS/Windows, and server message block/common Internet file system (SMB/CIFS). FIG. 5 illustrates internal and external components of data storage device 121 in greater details. Data storage device 121 may include a storage engine 122.

Storage engine 122 performs partitioning, storage and retrieval of data, which may be network traffic data received from network monitoring device 118 via network link 134. As described below, storage engine 122 may be optimized for extremely high data throughput. Storage engine 122 stores data in various repositories, such as packet data repository 124, metadata repository 128, time index repository 126 and flow repository 130. Storage engine 122 is further configured to retrieve subsets of network traffic data on demand. Storage engine 122 may receive search criteria and execute queries based on the received search criteria on the data stored in the repositories 124-130 to provide search results.

In an embodiment, packet data repository 124 stores a potentially large volume of raw network traffic (data packets) captured from network 102 by network monitoring device 118. In an illustrative embodiment, packet data repository 124 implements a storage system having an on-disk format representation that stores packet data sequentially on disk within regions, wherein each region comprises a predetermined amount of disk space represented by blocks. Those skilled in the art will appreciate that such storage scheme maximizes disk I/O performance.

Metadata repository 128 is a database of data about data (data packets) stored in packet data repository 124. One purpose of metadata repository 128 is to provide storage engine 122 a consistent and reliable means of access to captured network traffic data. In various embodiments metadata repository 128 can be stored in a physical location or may be a virtual database, in which metadata is drawn from separate sources. Metadata may include contextual information about the captured packets, for example, identifying information about the flow to which the packet belongs, packet size data, offset information or more detail about captured network traffic data. Metadata repository 128 may also be implemented as a sequential storage of metadata within a predetermined amount of disk space represented by blocks in order to get the most out of disk I/O performance.

It should be noted that, according to an embodiment of the present invention, storage engine 122 treats data collectively stored by the repositories 124-130 as time-series data. Time-series data is data that is associated with particular points in time or particular time intervals, often represented in the form of time stamps that are maintained with the data. In many network monitoring systems, in order to allow analysis to occur, it is desirable to collect the time-series data generated by a monitoring system of interest and store the data in a data repository, more specifically, time index repository 126.

Accordingly, in some embodiments, storage engine 122 can use the timestamp-indexed record for each packet data and metadata storage block to store profiling information for data access operations. This profiling information can indicate a time range associated with a given block. Advantageously, by specifying a specific interval of time, storage engine 122 is enabled to retrieve quickly and easily a plurality of timestamp-indexed records falling within the specified interval of time. Further, the retrieved plurality of timestamp-indexed records contains the profiling information indicative of position, length and other contextual information of the relevant blocks of packet and metadata stored by the packet data repository 124 and metadata repository 128, respectively. In other words, the retrieved timestamp indexed records allow quick and easy access to blocks of packet and metadata associated with a specific interval of time.

In an embodiment, flow repository 130 stores flow information associated with captured packet data stored in the packet data repository 124. It should be noted that network monitoring device 118 may collect network traffic information using a NetFlow™ protocol and send collected flow information to the storage engine 122. NetFlow™ was established by Cisco Systems for the purpose of collecting IP traffic information. NetFlow™ provides an established designation of seven elements of a packet that define the characteristics of a flow, including ingress interface, source IP address, destination IP address, IP protocol, source port for Uniform Datagram Protocol (UDP) or Transmission Control Protocol (TCP), destination port for UDP or TCP and IP type. According to an embodiment of the present invention, flow information stored in flow repository 130 may include a variety of parameters such as, but not limited to, a flow ID uniquely identifying each flow, each flow's start and end capture timestamp, MAC address, VLAN, source address, destination address, hostnames, port numbers, protocols, and the like. This flow information may be generated, for example, by network monitoring device 118 and provided to storage engine 122 for storage in flow repository 130.

Figure 2:
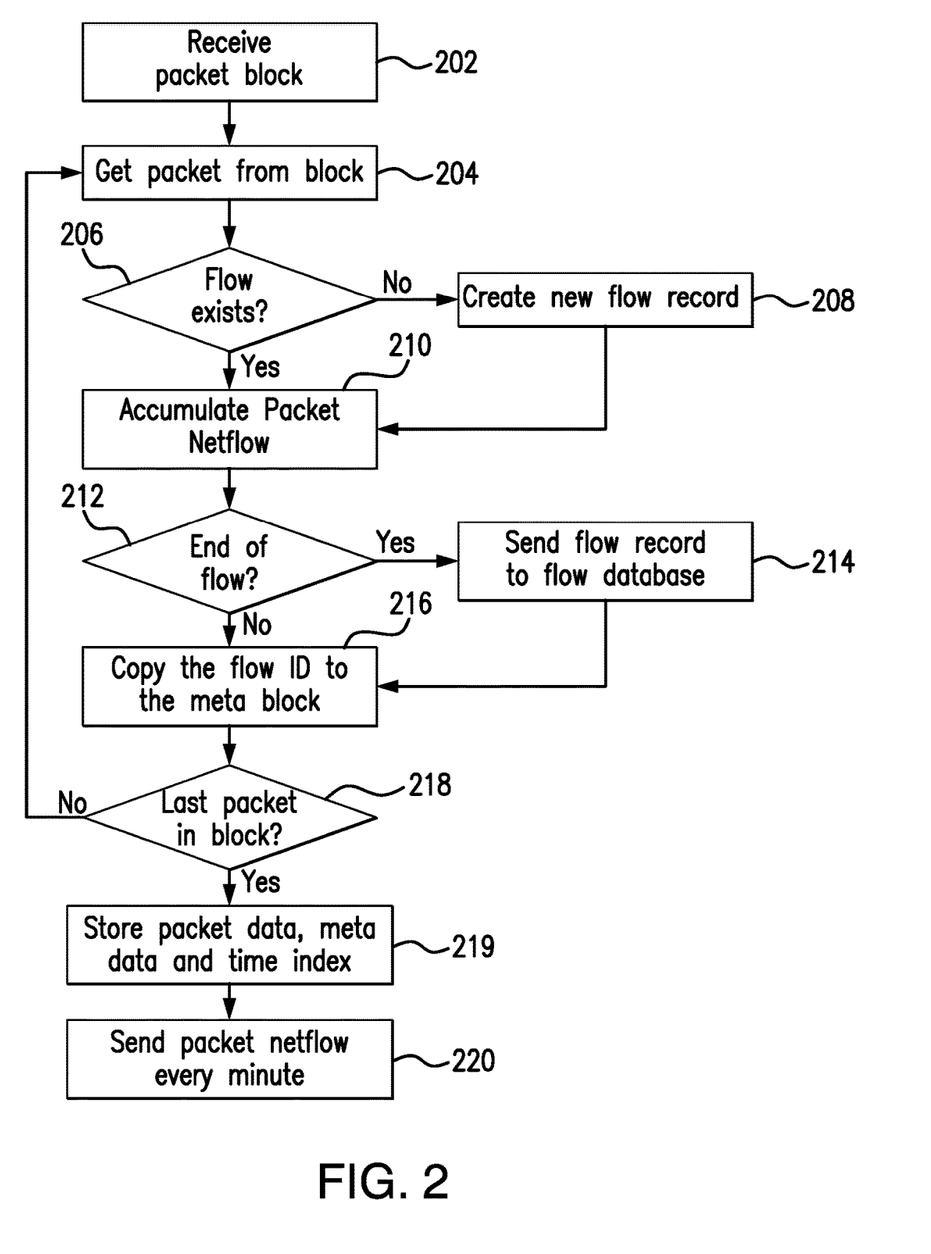
FIG. 2 is a flow diagram illustrating the steps performed by the storage engine of FIG. 1 to process and store received packets.
Figure 3:
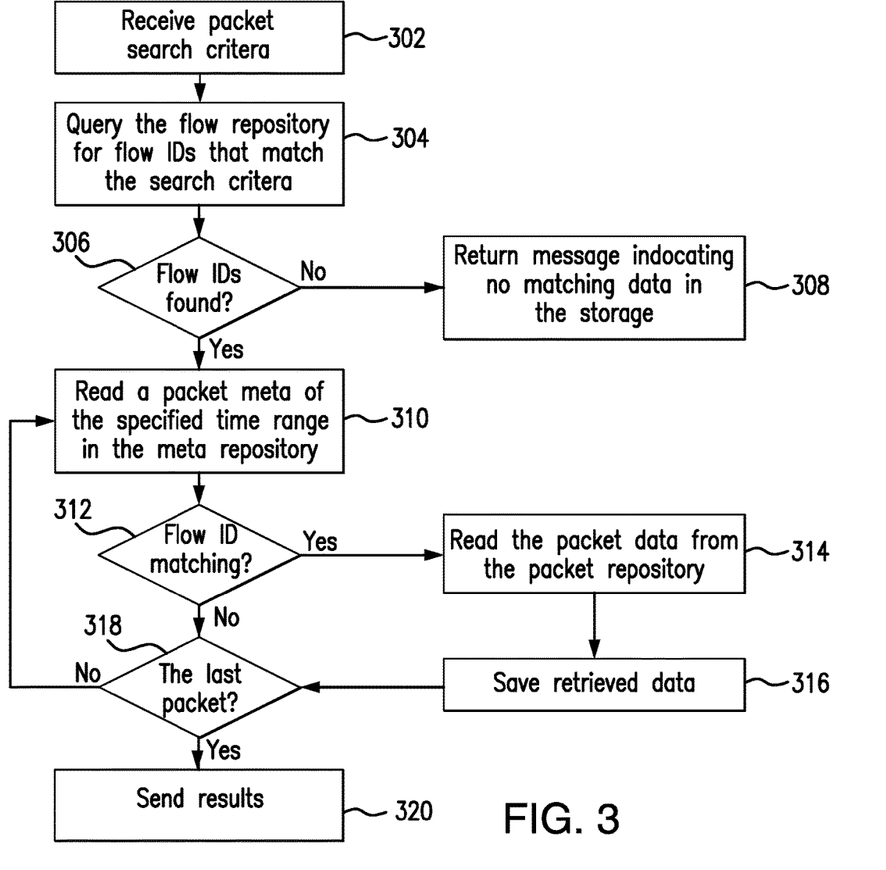
FIG. 3 is a flow diagram illustrating the steps performed by the storage engine of FIG. 1 to retrieve packets meeting specified criteria from the storage in accordance with illustrative embodiments of the present invention.

FIG. 2 is a flow diagram illustrating the steps performed by the storage engine 122 of FIG. 1 to process and store received packets and FIG. 3 is a flow diagram illustrating the steps performed by the storage engine 122 of FIG. 1 to retrieve packets meeting specified criteria from the storage in accordance with illustrative embodiments of the present invention. Before turning to descriptions of FIGS. 2 and 3, it is noted that the flow diagrams in FIGS. 2 and 3 show examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more steps may be omitted. In some embodiments, one or more additional steps may be performed. As will be appreciated by one skilled in the art, aspects of the present invention may be embodied as a method or computer program product.

Referring now to FIG. 2, at 202, storage engine 122 receives a block of captured packets from the NIC 120. As noted above, NIC 120 may be configured to perform packet acquisition and packaging. In one embodiment, step 202 may involve NIC 120 capturing traffic packets passing therethrough. In various embodiments, NIC 120 may capture all packets passing therethrough or may apply a filter so as to get only particular packets e.g. selected by a byte pattern, destination or a protocol. NIC 120 may also perform encapsulation of the captured traffic packets so as to form blocks of encapsulated packets of predefined size. The encapsulation is necessary in order to preserve the captured data and transport it over link 134 to storage engine 122 without changes such as changes to the destination address field which happen when a packet is conventionally sent over a network without encapsulation. In all embodiments of the present invention, NIC 120 captures data flows, or in other words flows of data packets. The data flows may be generated, for instance, by the devices 104-108. In one embodiment, NIC 120 assigns flow identifiers (IDs) to the data flows (packets sharing a number of properties, e.g., "same source, same destination, same protocol", essentially a "flow") according to any desired criteria for assigning IDs to data flows. In one embodiment, NIC 120 adds flow IDs and capture timestamps to the encapsulated packets. The timestamps added to the encapsulating portion of the captured packets by the NIC 120 are referred to as "capture timestamps" since they represent the time when each packet was captured by NIC 120. The capture timestamps are different from the timestamps which may already be present in the packet prior to the capture, such as Real-Time Transport Protocol (RTP) timestamps or MPEG Decode Time Stamp (DTS) and Presentation Time Stamp (PTS) timestamps; these pre-existing timestamps are preserved as part of the captured packet which is encapsulated. It should be noted that the process of capturing the data and encapsulation introduces a delay between the moment when the data was captured and the capture timestamp was added to the encapsulated packet. However, the delays are very small, and are substantially the same from packet to packet. Once the captured packets are encapsulated and timestamped, NIC 120 sends the encapsulated information to storage engine 122.

Next, at 204, storage engine 122 traverses each received encapsulated packet and decapsulates the encapsulated packets so as to obtain captured packets, the capture timestamps and the flow IDs. At 206, storage engine 122 processes the decapsulated information (i.e., flow ID) for each packet to determine whether a flow record exists for a flow associated with the packet. In response to determining that the flow record does not already exist (e.g., for a first flow associated with the first decapsulated packet) (decision block 206, "No" branch), at 208, storage engine 122 creates a new flow record. In some implementations, the new flow record may be added to a flow table maintained by storage engine 122. In response to determining that the flow record already exists (decision block 206, "Yes" branch) or after creating the flow record (step 208), at 210, storage engine 122 adds other extracted flow related information to the flow record. Such information may include, for example, aforementioned NetFlow™ information received in the encapsulated packets from NIC 120.

At 212, storage engine 122 determines whether the end of the flow has been reached. In other words, storage engine 122 decides whether the packet being currently processed is the last packet associated with a particular flow, if so (decision block 212, "Yes" branch), storage engine 122 exports the flow record to flow repository 130 (at 214). In one embodiment, storage engine 122 may transmit the flow record using Internet Protocol Flow Information Export (IPFIX). The IPFIX RFC defines how IP flow information is to be formatted and transferred from an exporter (the storage engine 122) to a collector (i.e., an application (not shown in FIG. 1) that is responsible for accessing flow repository 130). In response to determining that the end of the flow has not been reached yet (decision block 212, "No" branch), or after exporting the flow record to the flow repository (step 214), at 216, storage engine 122 adds flow ID associated with the packet being processed to a block of metadata. It is noted that storage engine 122 may create a new metadata block if such block has not been created during processing of preceding packets associated with the flow. In addition, at 216, storage engine 122 may save in the metadata block other contextual information related to the processed packet such as, but not limited to, capture timestamps, packet size data, offset information and the like.

At 218, storage engine 122 determines whether the packet being processed is the last packet in the block of encapsulated packets. If not (decision block 218, "No" branch), storage engine 122 returns to step 204, decapsulates next packet and repeats steps 206-218 for all remaining packets in the block. In response to determining that the last packet in the block has been processed (decision block 218, "Yes" branch), at 219, storage engine 122 stores the accumulated metadata and extracted raw packet data in metadata repository 128 and packet data repository 124, respectively. As noted above, both the packet data and corresponding metadata may be stored in a sequential (block-by-block) manner. Further, at 219, storage engine 122 stores in time index repository 126 the timestamp-indexed record for each corresponding packet data and metadata storage block. According to an embodiment of the present invention, packet data repository 124 is configured to store the raw captured packets so that the raw captured packets data is arranged in a physically sequential blocks in an order based on timestamp index values stored in time index repository 124.

At 220, storage engine 122 periodically sends the flow information associated with the stored packets to flow database 130 at regular intervals (e.g., every minute). The reason for reporting modified flow records at regular intervals (instead of every packet) is to allow for data aggregation. Within an interval, the number of individual packets typically far exceeds the number of unique flows associated with those packets. Sending a single modified flow record per flow each interval is significantly more efficient than sending a modified flow record for every packet. In step 214 when the end of a flow is detected, the modified flow record can be sent out immediately by storage engine 122 because no further packets associated with the flow are expected.

Referring now to FIG. 3, there is shown a flow diagram illustrating the steps performed by the storage engine of FIG. 1 to retrieve packets meeting specified criteria from the storage in accordance with illustrative embodiments of the present invention. A user of monitoring device 118 can select search criteria for searching stored network traffic data captured by network monitoring device 118. In some embodiments, search criteria are selected to search for network packets associated with a specific source and/or destination device, group of devices, category of devices, specific network protocol, network address, network port, or a group of network addresses and/or network ports, etc. In other embodiments, search criteria are selected to search for network traffic data having a timestamp within a specified time range. A user can enter and/or select search criteria using the user interface 119 of the network monitoring device 118. At 302, storage engine 122 receives packet search criteria specified by a user from network monitoring device 118. Further, at 304, storage engine 122 identifies and classifies a traffic flow that satisfies each search criterion. For example, storage engine 122 may identify one or more flow IDs based on flow information matching the specified search criteria in the specified time range by querying flow repository 130.

At 306, storage engine 122 determines if any flow IDs matching the search criteria are found in flow repository 130. If flow repository 130 does not return any flow IDs matching the search criteria (decision block 306, "No" branch), at 308, storage engine 122 sends a message to monitoring device 118 indicating that there is no data matching the search criteria in the storage. If flow repository 130 returns one or more flow IDs matching the search criteria, for each returned flow ID, there is a time range associated with it which designates when the flow starts and ends. Advantageously, this time range is typically narrower (smaller) as compared to the original period of time specified by a user in the request received from monitoring device 118. Thus, in response to determining that one or more flow IDs matching the search criteria were returned by flow repository 130 (decision block 306, "Yes" branch), at 310, storage engine 122 identifies metadata information responsive to the retrieved data flow information. For example, storage engine 122 may retrieve a block of metadata information from metadata repository 128 based on the time range associated with the returned flow IDs. In one embodiment, storage engine 122 retrieves metadata information associated with the time range using corresponding timestamp indexed records stored in time index repository 126. The retrieved metadata block corresponds to at least one flow associated with the one or more flow identifications. It should be noted that since the storage engine 122 utilizes smaller time range associated with the flow IDs, as compared to a user-specified time interval, the size of the retrieved metadata associated with the smaller time range should be considerably smaller as well.

Next, at 312, storage engine 122 is configured to evaluate the retrieved information block and compare flow IDs of the retrieved metadata with the flow IDs returned by flow repository 130. Responsive to finding matching flow IDs (decision block 312, "Yes" branch), at 314, storage engine 122 retrieves raw captured packets associated with the retrieved and matching metadata from packet data repository 124. In one embodiment, storage engine 122 retrieves raw packets information associated with the identified metadata using corresponding timestamp indexed records stored in time index repository 126 to facilitate fast time index based searching of raw packets information. Advantageously, the use of network data flow information by storage engine 122 reduces the size of raw packets data that needs to be searched and results in significantly reduced overhead and increased performance and reliability, as described in further detail below in conjunction with FIG. 4. Once the raw packet data of interest is extracted from packet data repository 124, storage engine 122 may optionally save the search results in various formats (step 316). These formats may include, but are not limited to, text files, eXtensible Markup Language (XML) documents, flat files, Binary files, and the like.

If storage engine 122 does not find any matching flow IDs in the retrieved block of metadata (decision block 312, "No" branch), at 318, storage engine 122 determines whether the packet under evaluation comprises the last packet in the retrieved block of metadata. If the packet under evaluation is not the last packet, storage engine 122 returns to step 310 and continuously repeats steps 310-318 for the remaining portion of the retrieved metadata until it reaches the last packet in the block. In response to a determination that the last packet in the retrieved metadata information block has been processed (decision block 318, "Yes" branch), at 320, storage engine 122 sends the search results matching user-specified criteria to monitoring device 118. Once monitoring device 118 receives the search results, the results may be presented to a user via user interface 119, for example.

Figure 4:
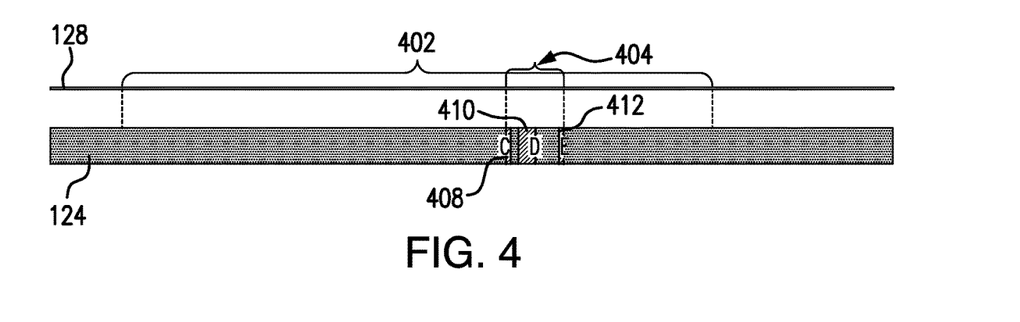
FIG. 4 illustrates an exemplary data retrieval process for data packets having specific time intervals in accordance with illustrative embodiments of the present invention.

FIG. 4 illustrates an exemplary data retrieval process in accordance with illustrative embodiments of the present invention. In FIG. 4, there are shown packet data repository 124 storing captured raw packets data organized into a plurality of continuous physical blocks on a mass storage and metadata repository 128 storing metadata associated with the captured raw packets stored in the packet data repository 124. It is noted that the stored metadata may also be organized into a plurality of continuous physical blocks. According to an embodiment of the present invention, in order to search time-series data stored in packet data repository 124, a user provides search criteria, which includes a certain time criterion (i.e., time range). In FIG. 4, the reference numeral 402 indicates a first portion of data that corresponds to the original user-specified time period. For illustrative purposes only, assume that the user specified search criteria only matches captured data associated with packets C, D and E indicated by the reference numerals 408, 410 and 412, respectively.

As discussed above in conjunction with FIG. 3, instead of searching the entire portion 402 of captured time series data corresponding to the user-specified time interval, storage engine 122 queries flow repository 130 (shown in FIG. 1), and identifies flow IDs of data flows associated with packets of interest 408-412 and extracts corresponding data flow information from flow repository 130. The extracted data flow information contains each identified flow's start and end capture timestamp. Based on that timestamp information, storage engine 122 identifies a time range associated with the retrieved data flow information. In FIG. 4, a second portion of data corresponding to this second time range is identified by the reference numeral 404. As clearly shown in FIG. 4, since the second time range is substantially smaller than the first time range, second portion of data 404 is substantially smaller than first portion 402. Further, in one embodiment, the average size of packet is 512 bytes, while the size of metadata associated with one packet is about 12 bytes. In other words, the ratio of size of metadata corresponding to raw captured packet to the size of the raw captured packet is approximately 1:45. Referring back to FIG. 4, storage engine 122 searches only the portion of metadata 404 corresponding to the second time range to identify exact locations of requested packets 408, 410 and 412 and retrieves those packets based on the identified metadata information.

To summarize, advantageously, the use of network data flow information associated with the captured network data and the use of metadata information associated with the captured network data by storage engine 122 reduces the size of raw packets data that needs to be searched and results in significantly reduced overhead and increased performance and reliability.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 5 is a schematic block diagram of an example data storage device 121 that may be used (or components thereof) with one or more embodiments described herein. Data storage device 121 is only one example of a suitable system and is not intended to suggest any limitation as to the scope of use or functionality of embodiments of the invention described herein. Regardless, data storage device 121 is capable of being implemented and/or performing any of the functionality set forth herein.

Data storage device 121 is operational with numerous other general purpose or special purpose computing system environments or configurations. Examples of well-known computing systems, environments, and/or configurations that may be suitable for use with data storage device 121 include, but are not limited to, personal computer systems, server computer systems, thin clients, thick clients, handheld or laptop devices (including mobile devices such as smart phones and tablets), multiprocessor systems, microprocessor-based systems, set top boxes, programmable consumer electronics, network PCs, minicomputer systems, mainframe computer systems, and distributed data processing environments that include any of the above systems or devices, and the like.

Data storage device 121 may be described in the general context of computer system-executable instructions, such as program modules, being executed by a computer system. Generally, program modules may include routines, programs, objects, components, logic, data structures, and so on that perform particular tasks or implement particular abstract data types. Data storage device 121 may be practiced in distributed data processing environments where tasks are performed by remote processing devices that are linked through the communication network 102. In a distributed data processing environment, program modules may be located in both local and remote computer system storage media including memory storage devices.

Data storage device 121 is shown in FIG. 5 in the form of a general-purpose computing device. The components of device 121 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect express (PCIe) bus.

Data storage device 121 typically includes a variety of computer system readable media. Such media may be any available media that is accessible by device 121, and it includes both volatile and non-volatile media, removable and non-removable media.

System memory 528 can include computer system readable media in the form of volatile memory, such as random access memory (RAM) 530 and/or cache memory 532. Data storage device 121 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 515, such as storage engine 122 described above, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 515 generally carry out the functions and/or methodologies of embodiments of the invention as described herein.

Data storage device 121 may also communicate with one or more external devices 514 such as a keyboard, a pointing device, a display 524, etc.; one or more devices that enable a user to interact with data storage device 121; and/or any devices (e.g., network card, modem, etc.) that enable data storage device 121 to communicate with one or more other computing devices. Such communication can occur via Input/Output (I/O) interfaces 522. Still yet, device 121 can communicate with one or more networks such as a LAN, a general WAN, and/or a public network (e.g., the Internet) via network adapter 520. As depicted, network adapter 520 communicates with the other components of data storage device 121 via bus 518. It should be understood that although not shown, other hardware and/or software components could be used in conjunction with device 121. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A storage system in a high capacity network, the system comprising:
    a network monitoring device having a network interface card coupled to a high capacity network and configured to capture data packets from the network to provide raw captured packets;
    a first data repository configured to store the raw captured packets;
    a second data repository configured to store metadata associated with the raw data packets stored in the first data repository;
    a third data repository configured to store timestamp indexed data associated with the raw data packets stored in the first data repository and configured to store timestamp indexed data associated with the metadata stored in the second data repository;
    a fourth data repository configured to store data flow information associated with the raw data packets stored in the first data repository; and
    a storage engine coupled to the first, second, third and fourth data repositories, the storage engine configured to:
        receive packet search criteria, the packet search criteria specifying at least a first time range;
        retrieve data flow information associated with the packet search criteria from the fourth data repository, wherein the retrieved data flow information is associated with a second time range and wherein the second time range is narrower than the first time range;
        retrieve metadata information associated with the second time range from the second data repository using corresponding timestamp indexed data stored in the third data repository; and
        retrieve raw captured data packets associated with the retrieved metadata from the first data repository using corresponding timestamp indexed data stored in the third data repository.

2. The storage system as recited in claim 1, wherein the first data repository is configured to store the raw captured packets so that the raw captured packets data is arranged in a physically sequential blocks in an order based on timestamp index values stored in the third data repository.

3. The storage system as recited in claim 1, wherein the metadata associated with each raw captured data packet comprises information identifying a data flow to which the raw captured data packet belongs, a length of the raw captured data packet and an offset of the raw captured data packet in a corresponding physically sequential block.

4. The storage system as recited in claim 1, wherein the data flow information stored in the fourth data repository comprises at least one of the following: data flow identifier information identifying a data flow, a first timestamp indicating a start time for the data flow and a second timestamp indicating an end time for the data flow, source-destination address pairs associated with the data flow, source-destination port pairs associated with the data flow, a protocol identifier, a VLAN identifier associated with the data flow.

5. The storage system as recited in claim 4, wherein the network monitoring device is further configured to encapsulate the captured data packets so as to form packet blocks of predefined size.

6. The storage system as recited in claim 4, wherein the second time range is defined by the first and second timestamps.

7. The storage system as recited in claim 5, wherein the storage engine is further configured to extract from each received encapsulated packet block the information identifying the data flow to which the raw data packet belongs, the length of the raw data packet and the offset of the raw data packet and configured to store the extracted information in the second data depository.

8. The storage system as recited in claim 1, wherein the ratio of size of metadata corresponding to raw captured packet to size of the raw captured packet is approximately 1:45.

9. The storage system as recited in claim 1, wherein the storage engine configured to retrieve the metadata information is further configured to identify metadata information matching the retrieved data flow information.

10. A method for retrieving captured network traffic data in a high capacity network, the method comprising:
receiving packet search criteria, the packet search criteria specifying at least a first time range;
retrieving data flow information associated with the packet search criteria from a fourth data repository, wherein the retrieved data flow information is associated with a second time range, wherein the second time range is narrower than the first time range, and wherein the fourth data repository is configured to store data flow information associated with captured raw data packets stored in a first data repository;
retrieving metadata information associated with the second time range from a second data repository using corresponding timestamp indexed data stored in a third data repository, wherein the second data repository is configured to store metadata associated with the raw data packets stored in the first data repository and wherein the third data repository is configured to store timestamp indexed data associated with the raw data packets stored in the first data repository and configured to store timestamp indexed data associated with the metadata stored in the second data repository; and
retrieving raw captured data packets associated with the retrieved metadata from the first data repository using corresponding timestamp indexed data stored in the third data repository.

11. The method of claim 10, wherein the first data repository is configured to store the raw captured packets so that the raw captured packets data is arranged in a physically sequential blocks in an order based on timestamp index values stored in the third data repository.

12. The method of claim 10, wherein the metadata associated with each raw captured data packet comprises information identifying a data flow to which the raw captured data packet belongs, a length of the raw captured data packet and an offset of the raw captured data packet in a corresponding physically sequential block.

13. The method of claim 10, wherein the data flow information stored in the fourth data repository comprises at least one of the following: data flow identifier information identifying a data flow, a first timestamp indicating a start time for the data flow and a second timestamp indicating an end time for the data flow, source-destination address pairs associated with the data flow, source-destination port pairs associated with the data flow, a protocol identifier, a VLAN identifier associated with the data flow.

14. The method of claim 10, further comprising sending the retrieved raw captured data packets to a network monitoring device.

15. The method of claim 10, wherein the second time range is defined by the first and second timestamps.

16. The method of claim 14, further comprising presenting the retrieved raw captured data packets to a user via a user interface of the network monitoring device.

17. The method of claim 10, wherein the ratio of size of metadata corresponding to raw captured packet to size of the raw captured packet is approximately 1:45.

18. The method of claim 10, wherein retrieving the metadata information is further comprising identifying metadata information matching the retrieved data flow information.

19. A computer program product for retrieving captured network traffic data in a high capacity network, the computer program product comprising:
one or more computer-readable storage devices and a plurality of program instructions stored on at least one of the one or more computer-readable storage devices, the plurality of program instructions comprising:
program instructions to receive packet search criteria, the packet search criteria specifying at least a first time range;
program instructions to retrieve data flow information associated with the packet search criteria from a fourth data repository, wherein the retrieved data flow information is associated with a second time range, wherein the second time range is narrower than the first time range, and wherein the fourth data repository is configured to store data flow information associated with captured raw data packets stored in a first data repository;
program instructions to retrieve metadata information associated with the second time range from a second data repository using corresponding timestamp indexed data stored in a third data repository, wherein the second data repository is configured to store metadata associated with the raw data packets stored in the first data repository and wherein the third data repository is configured to store timestamp indexed data associated with the raw data packets stored in the first data repository and configured to store timestamp indexed data associated with the metadata stored in the second data repository; and
program instructions to retrieve raw captured data packets associated with the retrieved metadata from the first data repository using corresponding timestamp indexed data stored in the third data repository.

20. The computer program product of claim 19, wherein the first data repository is configured to store the raw captured packets so that the raw captured packets data is arranged in a physically sequential blocks in an order based on timestamp index values stored in the third data repository.

* * * * *